US012638010B2

(12) United States Patent     (10) Patent No.:   US 12,638,010 B2

Ishihara et al.     (45) Date of Patent:    May 26, 2026

(54) MOTOR-DRIVEN COMPRESSOR FOR VEHICLE

(71) Applicant: KABUSHIKI KAISHA TOYOTA JIDOSHOKKI, Kariya (JP)

(72) Inventors: Hiroki Ishihara, Kariya (JP); Katsuya Usami, Kariya (JP); Atsushi Oshima, Kariya (JP); Satoshi Okada, Kariya (JP); Yoshifumi Tada, Kariya (JP); Takuya Sagawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 163 days.

(21) Appl. No.: 18/358,233

(22) Filed: Jul. 25, 2023

(65) Prior Publication Data

US 2024/0052819 A1    Feb. 15, 2024

(30) Foreign Application Priority Data

Aug. 9, 2022    (JP) ................................. 2022-127068

(51) Int. Cl.
| | |
|---|---|
| *H01M 10/48* | (2006.01) |
| *B60W 40/11* | (2012.01) |
| *F04B 35/04* | (2006.01) |
| *H02H 7/18* | (2006.01) |

(52) U.S. Cl.
CPC ............... *F04B 35/04* (2013.01); *H02H 7/18* (2013.01); *F04B 2203/0208* (2013.01)

(58) Field of Classification Search
CPC .......... B60L 58/10; B60L 58/16; B60L 58/24; B60L 7/14; B60L 2250/10; B60L 53/20; B60L 58/13; H01M 10/465; H01M 2220/30; H01M 50/213; H01M 10/48; H01M 2220/20; H01M 10/425; H01M 10/482; H01M 10/486; H01M 2010/4271; H01M 2010/4278; H02P 6/16; H02K 11/215; H02K 11/22; H02K 11/33; H02K 29/08; H02K 29/10; H02K 5/12; H02K 7/14

See application file for complete search history.

(56) References Cited

U.S. PATENT DOCUMENTS

| | | | | |
|---|---|---|---|---|
| 2010/0315024 | A1* | 12/2010 | Najima | ............. H02M 7/53871 |
| | | | | 318/139 |
| 2016/0352120 | A1* | 12/2016 | Lovett | ..................... B60L 53/20 |
| 2017/0279393 | A1* | 9/2017 | Kawashima | ......... B60H 1/3222 |

FOREIGN PATENT DOCUMENTS

| | | |
|---|---|---|
| JP | 07-85390 A | 3/1995 |
| JP | 2001-341595 A | 12/2001 |
| JP | 2006-149070 A | 6/2006 |
| JP | 2009-171312 A | 7/2009 |
| JP | 2013-243873 A | 12/2013 |
| JP | 2021-125890 A | 8/2021 |

* cited by examiner

*Primary Examiner* — Kawing Chan
*Assistant Examiner* — Charles S Laughlin
(74) *Attorney, Agent, or Firm* — Sughrue Mion, PLLC

(57)        ABSTRACT

A motor-driven compressor for a vehicle includes a control device and a detection circuit. The detection circuit includes an AD conversion circuit. The AD conversion circuit converts an on-voltage from an analog signal to a digital signal. The control device is configured to determine that a battery is in an overvoltage state and stop the motor-driven compressor for the vehicle when a value of the on-voltage detected from the digital signal is larger than an overvoltage determination threshold value.

7 Claims, 2 Drawing Sheets

MOTOR-DRIVEN COMPRESSOR FOR VEHICLE

BACKGROUND

1. Field

The present disclosure relates to a motor-driven compressor for a vehicle.

2. Description of Related Art

Japanese Laid-Open Patent Publication No. 2001-341595 discloses a power supply control device that includes a control device and two voltage divider resistors. An ignition voltage is applied to the two voltage divider resistors. The ignition voltage is received from a battery via an ignition switch. When the ignition switch is turned on, the battery and the two voltage divider resistors are electrically connected to each other. This causes the ignition voltage to be applied to the two voltage divider resistors. The voltage divided by the two voltage divider resistors is applied to the control device. The control device determines whether the ignition voltage is larger than a threshold value from the voltage divided by the two voltage divider resistors.

In the power supply control device disclosed in Japanese Laid-Open Patent Publication No. 2001-341595, current constantly flows through the voltage divider resistors while the ignition switch is on. This increases the power consumption of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A motor-driven compressor for a vehicle according to an aspect of the present disclosure includes an electric motor, an inverter configured to supply AC power to the electric motor, a high-voltage circuit including a control device configured to control the inverter, a compression portion configured to be driven by the electric motor, and a low-voltage circuit including a detection circuit configured to detect an on-voltage received from a battery via a start switch of the vehicle. The detection circuit includes an AD conversion circuit configured to convert the on-voltage from an analog signal to a digital signal, a switching element located at an on-voltage input side of the AD conversion circuit, and a switch configured to turn on the switching element when receiving a wake-up signal. The control device is configured to determine that the battery is in an overvoltage state and stop the motor-driven compressor for the vehicle when a value of the on-voltage detected from the digital signal is larger than an overvoltage determination threshold value.

A motor-driven compressor for a vehicle according to another aspect of the present disclosure includes an electric motor, an inverter configured to supply AC power to the electric motor, a high-voltage circuit including a control device configured to control the inverter, a compression portion configured to be driven by the electric motor, and a low-voltage circuit including a detection circuit configured to detect an on-voltage received from a battery via a start switch of the vehicle. The detection circuit includes an AD conversion circuit configured to convert the on-voltage from an analog signal to a digital signal, a switching element located at an on-voltage input side of the AD conversion circuit, and a switch configured to turn on the switching element when receiving a wake-up signal. The control device is configured to determine that the battery is in a low-voltage state and stop the motor-driven compressor for the vehicle when a value of the on-voltage detected from the digital signal is smaller than a low-voltage determination threshold value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a motor-driven compressor for a vehicle will now be described.

Figure 1:
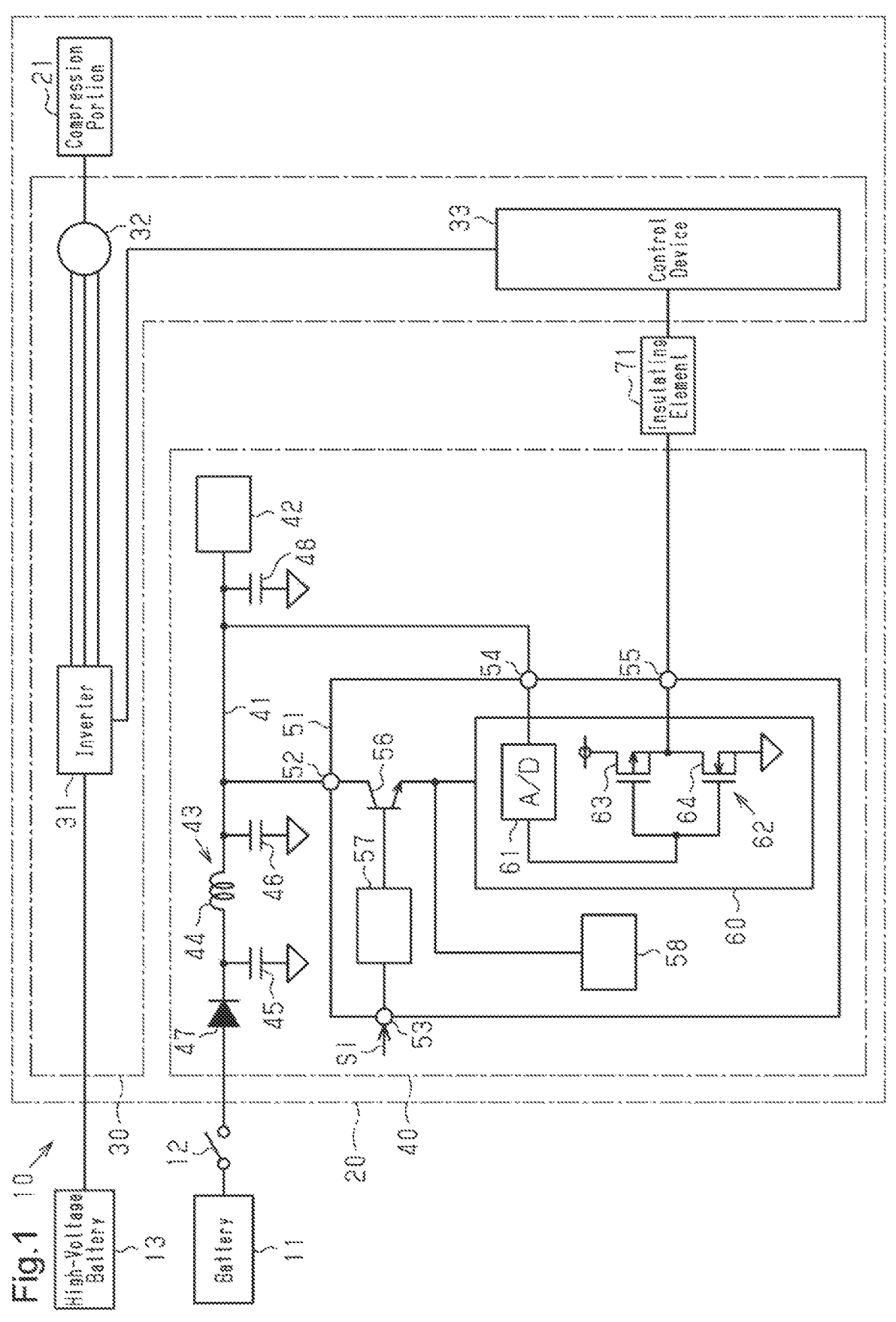
FIG. 1 is a schematic diagram showing the configuration of a motor-driven compressor for a vehicle.

As shown in FIG. 1, a vehicle 10 includes a battery 11, an ignition switch 12, a high-voltage battery 13, and a motor-driven compressor 20.

The battery 11 may be of any type if it can be charged and discharged. The battery 11 is, for example, a lead-acid battery.

The ignition switch 12 is connected to the battery 11. The ignition switch 12 is turned on when the vehicle 10 is started. The ignition switch 12 may be referred to as a start switch.

The high-voltage battery 13 may be of any type if it can be charged and discharged. The high-voltage battery 13 is, for example, a lithium-ion rechargeable battery. The rated value of the output voltage at the high-voltage battery 13 is higher than that of the output voltage at the battery 11.

Motor-Driven Compressor

The motor-driven compressor 20 includes a compression portion 21, a high-voltage circuit 30, a low-voltage circuit 40, and an insulating element 71. The motor-driven compressor 20 is used, for example, to supply refrigerant to an external refrigerant circuit that cools and heats the interior of the vehicle.

The compression portion 21 compresses and discharges drawn fluid. The fluid is, for example, refrigerant. The type of the compression portion 21 is, for example, a scroll type, a piston type, or a vane type.

The high-voltage circuit 30 includes an inverter 31, an electric motor 32, and a control device 33. The high-voltage circuit 30 operates with power supplied from the high-voltage battery 13.

The inverter 31 is a three-phase inverter that converts DC power supplied from the high-voltage battery 13 into AC power and outputs the AC power. The inverter 31 converts DC power into AC power through, for example, a switching operation performed on a switching element.

The electric motor 32 is a three-phase motor. The inverter 31 and the electric motor 32 are electrically connected to each other. The electric motor 32 is driven by the AC power supplied from the inverter 31. The compression portion 21 is driven by the driving of the electric motor 32.

The control device 33 controls the inverter 31. For example, the control device 33 controls the switching element of the inverter 31 so that the inverter 31 converts DC power into AC power.

The control device 33 includes a processor and a memory. The processor is, for example, a central processing unit (CPU), a graphics processing unit (GPU), or a digital signal processor (DSP). The memory includes a random access memory (RAM) and a read-only memory (ROM). The memory stores program codes or instructions configured to cause the processor to execute processes. The memory, or a computer-readable medium, includes any type of media that is accessible by general-purpose computers and dedicated computers. The control device 33 may include a hardware circuit such as an application-specific integrated circuit (ASIC) or a field-programmable gate array (FPGA). The control device 33, which is processing circuitry, may include one or more processors that run according to a computer program, one or more hardware circuits (e.g., ASIC or FPGA), or a combination thereof.

The low-voltage circuit 40 includes a connection line 41, a power supply circuit 42, a filter circuit 43, a diode 47, a capacitor 48, and a detection circuit 51. The low-voltage circuit 40 operates with power supplied from the battery 11.

The connection line 41 is connected to the ignition switch 12. When the ignition switch 12 is turned on, the voltage at the battery 11 is applied to the connection line 41. The voltage received from the battery 11 via the ignition switch 12 is referred to as an ignition voltage. The ignition voltage is an example of on-voltage.

The power supply circuit 42 is connected to the connection line 41. The ignition voltage is applied to the power supply circuit 42 via the connection line 41. The power supply circuit 42 converts the voltage supplied from the battery 11 and outputs the converted voltage. The power supply circuit 42 includes, for example, a transformer and a switching element.

The filter circuit 43 is located between the ignition switch 12 and the power supply circuit 42. The filter circuit 43 includes one inductor 44 and two capacitors 45, 46. The inductor 44 is located in the connection line 41. The inductor 44 is located between the two capacitors 45, 46. The two capacitors 45, 46 connect the connection line 41 to ground.

The diode 47 is located between the ignition switch 12 and the filter circuit 43. The anode of the diode 47 is connected to the ignition switch 12. The cathode of the diode 47 is connected to the filter circuit 43.

The capacitor 48 is located between the filter circuit 43 and the power supply circuit 42. The capacitor 48 connects the connection line 41 to ground.

Detection Circuit

The detection circuit 51 includes a power supply terminal 52, a signal input terminal 53, an input terminal 54, an output terminal 55, a switching element 56, a switch 57, a circuit unit 58, and an ignition voltage detection circuit 60. The detection circuit 51 is used to detect the ignition voltage.

The power supply terminal 52 is connected to a portion of the connection line 41 between the filter circuit 43 and the capacitor 48. The signal input terminal 53 receives a wake-up signal Si transmitted from an upper-rank control device. The input terminal 54 is connected to a portion of the connection line 41 between the filter circuit 43 and the capacitor 48. The output terminal 55 is connected to the insulating element 71.

The switching element 56 is located between the power supply terminal 52 and the ignition voltage detection circuit 60. When the switching element 56 is turned on, the ignition voltage is applied from the connection line 41 to the ignition voltage detection circuit 60. This causes the ignition voltage detection circuit 60 to operate. When the switching element 56 is turned off, the ignition voltage is not applied from the connection line 41 to the ignition voltage detection circuit 60. As a result, the ignition voltage detection circuit 60 does not operate. The switching element 56 may be of any type. In the present embodiment, the switching element 56 is a transistor. A collector of the switching element 56 is connected to the power supply terminal 52. An emitter of the switching element 56 is connected to the ignition voltage detection circuit 60.

The switch 57 is connected to the signal input terminal 53. Upon receipt of the wake-up signal Si, the switch 57 switches the switching element 56 on or off. When receiving the wake-up signal Si via the signal input terminal 53, the switch 57 turns on the switching element 56. For example, when receiving a sleep signal from the upper-rank control device, the switch 57 turns off the switching element 56. The hardware configuration of the switch 57 includes, for example, a processor and a memory.

The circuit unit 58 is connected to the emitter of the switching element 56. When the switching element 56 is turned on, the ignition voltage is applied from the connection line 41 to the circuit unit 58. The circuit unit 58 includes a driving circuit. The driving circuit drives the power supply circuit 42 by operating a switching element of the power supply circuit 42.

The ignition voltage detection circuit 60 includes an AD conversion circuit 61 and a converter 62. The switching element 56, which is located between the power supply terminal 52 and the ignition voltage detection circuit 60, is located at an on-voltage input side of the AD conversion circuit 61.

The AD conversion circuit 61 is connected to the input terminal 54. The AD conversion circuit 61 receives the ignition voltage from the input terminal 54. The AD conversion circuit 61 converts the ignition voltage, which has been received from the input terminal 54, from an analog signal to a digital signal. The AD conversion circuit 61 converts the ignition voltage into bit information represented by two values. The AD conversion circuit 61 outputs a digital signal corresponding to the bit information. For example, the digital signal is a pulse wave in which 0 is a low level and 1 is a high level in the two values.

The converter 62 includes a first switching element 63 and a second switching element 64. The first switching element

63 is a p-channel metal-oxide-semiconductor field-effect transistor (MOSFET). The second switching element 64 is an n-channel MOSFET. The first switching element 63 and the second switching element 64 are connected in series to each other. The drain of the first switching element 63 is connected to the power supply. The source of the first switching element 63 is connected to the drain of the second switching element 64. The source of the second switching element 64 is connected to ground. The gate of the first switching element 63 is connected to the AD conversion circuit 61. The gate of the second switching element 64 is connected to the AD conversion circuit 61. A connection point between the first switching element 63 and the second switching element 64 is connected to the output terminal 55.

In the converter 62, switching operations are performed on the first switching element 63 and the second switching element 64 with the digital signal output from the AD conversion circuit 61. Thus, the converter 62 converts the voltage of the digital signal into a voltage that can be detected by the insulating element 71. When the AD conversion circuit 61 outputs a low-level signal, the first switching element 63 is turned off and the second switching element 64 is turned on. In this case, when the output terminal 55 is connected to ground, the converter 62 outputs a low-level signal. When the AD conversion circuit 61 outputs a high-level signal, the first switching element 63 is turned on and the second switching element 64 is turned off. In this case, when the power supply is electrically connected to the output terminal 55, the converter 62 outputs a high-level signal.

The insulating element 71 is connected to the control device 33. The insulating element 71 connects the AD conversion circuit 61 to the control device 33 via the converter 62. The insulating element 71 transmits a digital signal to the control device 33 while maintaining insulation between the low-voltage circuit 40 and the high-voltage circuit 30. The insulating element 71 receives the digital signal output from the AD conversion circuit 61 via the converter 62. The insulating element 71 outputs the digital signal to the control device 33. The insulating element 71 is, for example, an isolator or a photocoupler.

The control device 33 receives a digital signal from the insulating element 71. The control device 33 detects the value [V] of the ignition voltage from the digital signal. The control device 33 determines that the battery 11 is in an overvoltage state when the value of the ignition voltage is larger than an overvoltage determination threshold value. The overvoltage determination threshold value is a predetermined value. The overvoltage determination threshold value is stored in the memory of the control device 33. When the value of the ignition voltage is smaller than a low-voltage determination threshold value, the control device 33 determines that the battery 11 is in a low-voltage state. The low-voltage determination threshold value is a predetermined value. The low-voltage threshold value is stored in the memory of the control device 33. The control device 33 performs both the determination of whether the battery 11 is in an overvoltage state and the determination of whether the battery 11 is in a low-voltage state. Instead, the control device 33 may perform only one of the two determinations.

When determining that the battery 11 is in an overvoltage state, the control device 33 stops the motor-driven compressor 20. For example, the control device 33 stops the inverter 31. When determining that the battery 11 is in a low-voltage state, the control device 33 stops the motor-driven compressor 20.

Operation of Present Embodiment

A low-voltage circuit of a comparative example will now be described. In the low-voltage circuit of the comparative example, the same members as those of the low-voltage circuit 40 of the embodiment are denoted by the same reference numerals. Such members will not be described.

Figure 2:
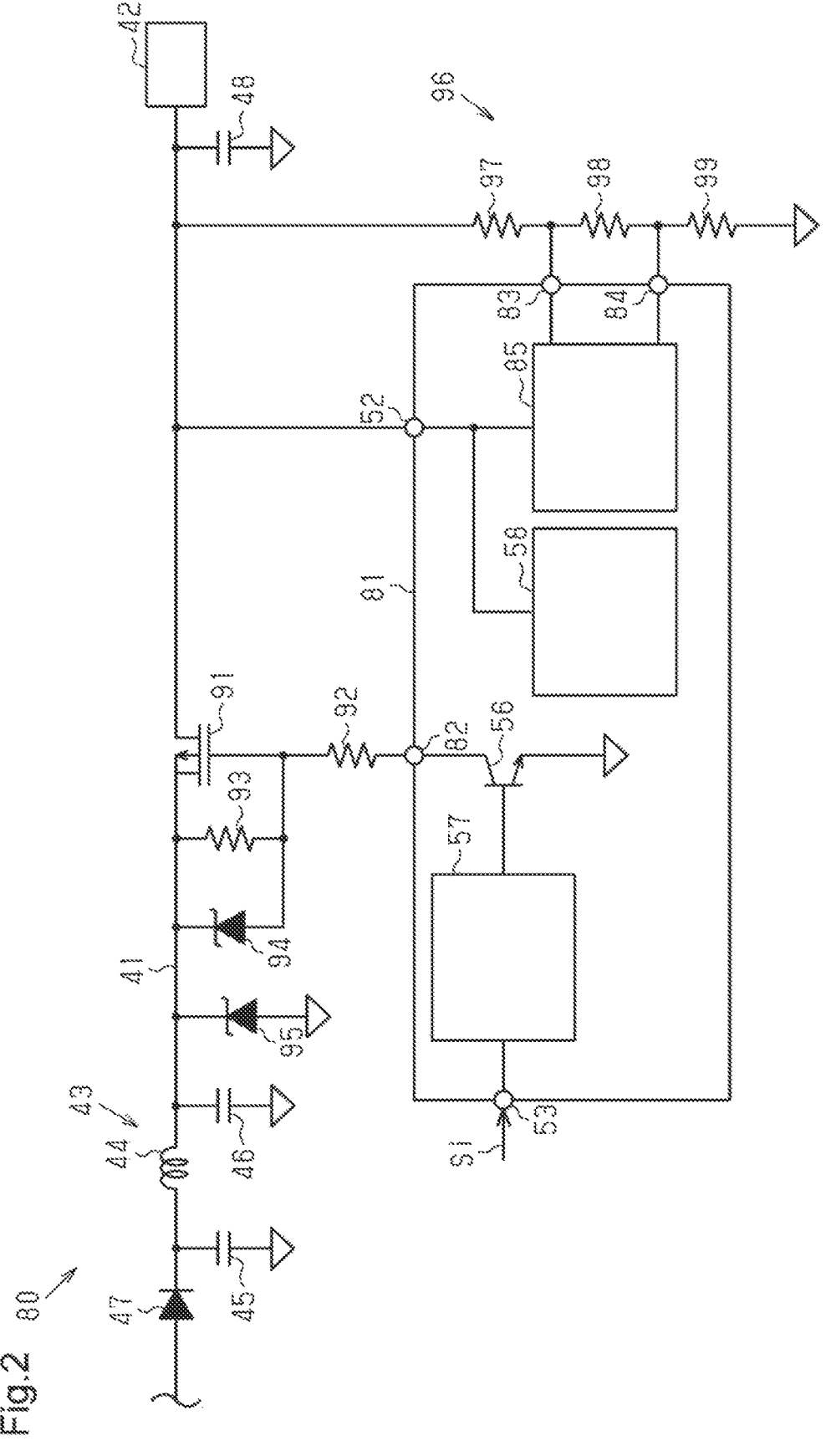
FIG. 2 is a diagram showing a low-voltage circuit according to a comparative example.

As shown in FIG. 2, the low-voltage circuit 80 of the comparative example includes a connection line 41, a power supply circuit 42, a capacitor 48, a detection circuit 81, a load switch 91, resistor elements 92, 93, Zener diodes 94, 95, and a voltage divider resistor 96.

The detection circuit 81 includes a power supply terminal 52, a signal input terminal 53, a switching terminal 82, a first input terminal 83, a second input terminal 84, a switching element 56, a switch 57, a circuit unit 58, and an ignition voltage detection circuit 85. The switching terminal 82 is connected to the collector of the switching element 56. The first input terminal 83 and the second input terminal 84 are connected to the ignition voltage detection circuit 85.

The load switch 91 is located between the filter circuit 43 and the power supply circuit 42. The load switch 91 may be of any type. The load switch 91 of the present embodiment is a p-channel MOSFET. The gate of the load switch 91 is connected to the switching terminal 82 via the resistor element 92. The resistor element 93 is connected between the source and gate of the load switch 91. The Zener diode 94 is connected between the source and gate of the load switch 91.

The Zener diode 95 is located between the load switch 91 and the filter circuit 43. The Zener diode 95 connects the connection line 41 to ground.

The voltage divider resistor 96 is located between the load switch 91 and the power supply circuit 42. The voltage divider resistor 96 includes a first voltage divider resistor element 97, a second voltage divider resistor element 98, and a third voltage divider resistor element 99. The first voltage divider resistor element 97, the second voltage divider resistor element 98, and the third voltage divider resistor element 99 are connected in series to each other between the connection line 41 and ground.

The first input terminal 83 is connected to a connection point between the first voltage divider resistor element 97 and the second voltage divider resistor element 98. The second input terminal 84 is connected to a connection point between the second voltage divider resistor element 98 and the third voltage divider resistor element 99.

The ignition voltage detection circuit 85 is a comparator. The ignition voltage detection circuit 85 compares a signal received from the first input terminal 83 with a signal received from the second input terminal 84 to determine whether the ignition voltage is higher than the overvoltage determination threshold value. The ignition voltage detection circuit 85 outputs a low-level signal when the ignition voltage is less than or equal to the overvoltage determination threshold value. The ignition voltage detection circuit 85 outputs a high-level signal when the ignition voltage is greater than the overvoltage determination threshold value. The ignition voltage detection circuit 85 is connected to the control device 33 via an insulating element in the same manner as the embodiment. When receiving the high-level signal from the ignition voltage detection circuit 85, the control device 33 determines that the battery 11 is in an overvoltage state. Although not shown, the low-voltage circuit 80 includes a voltage divider resistor, an ignition voltage detection circuit, and an insulating element that are used for low-voltage determination. The ignition voltage detection circuit for low-voltage determination outputs a low-level signal when the ignition voltage is greater than or equal to the overvoltage determination threshold value. The ignition voltage detection circuit for low-voltage determination outputs a high-level signal when the ignition voltage is less than the overvoltage determination threshold value. When receiving the high-level signal from the ignition voltage detection circuit for low-voltage determination, the control device 33 determines that the battery 11 is in a low-voltage state.

When the switch 57 receives the wake-up signal Si, the switching element 56 is turned on. This causes the load switch 91 to be turned on. The ignition voltage is applied to the ignition voltage detection circuit 85, the circuit unit 58, and the voltage divider resistor 96. This causes the ignition voltage detection circuit 85 and the circuit unit 58 to operate.

The low-voltage circuit 80 of the comparative example needs to include the voltage divider resistor 96 in order to set the overvoltage determination threshold value and the low-voltage determination threshold value. In a case in which the low-voltage circuit 80 of the comparative example has not received the wake-up signal Si, the load switch 91 is not turned on. This lowers the power consumption of the battery 11 that occurs due to the current flowing through the voltage divider resistor 96. However, the low-voltage circuit 80 of the comparative example needs to include the load switch 91 in order to prevent current from flowing through the voltage divider resistor 96 when the wake-up signal Si is not received.

In the embodiment, the ignition voltage is converted into a digital signal by the AD conversion circuit 61. Then, the digital signal is output to the control device 33 to cause the control device 33 to determine whether the battery 11 is in an overvoltage state or in a low-voltage state. Since the low-voltage circuit 40 does not need to include the voltage divider resistor 96, this eliminates the need for the load switch 91.

Advantages of Present Embodiment (1) The AD conversion circuit 61 converts the ignition voltage from an analog signal into a digital signal. The control device 33 detects the value of the ignition voltage from the digital signal. The control device 33 determines whether the battery 11 is in an overvoltage state from the value of the ignition voltage. In the comparative example, a comparator is used as the ignition voltage detection circuit 85. In this case, the comparator needs to receive the voltage divided by the voltage divider resistor 96. When the AD conversion circuit 61 is used, the control device 33 determines whether the battery 11 is in an overvoltage state without using the voltage divider resistor 96. This limits an increase in the power consumption of the battery 11 caused by the current flowing through the voltage divider resistor 96.

When the switching element 56 is on, the ignition voltage is applied to the ignition voltage detection circuit 60 and the circuit unit 58. When the switching element 56 is off, the ignition voltage is not applied to the ignition voltage detection circuit 60 and the circuit unit 58. This limits an increase in the power consumption of the battery 11.

(2) The control device 33 determines whether the battery 11 is in a low-voltage state from the value of the ignition voltage. By using the AD conversion circuit 61, the control device 33 determines whether the battery 11 is in a low-voltage state without using the voltage divider resistor 96.

This limits an increase in the power consumption of the battery 11 caused by the current flowing through the voltage divider resistor 96.

(3) The AD conversion circuit 61 converts the analog signal into bit information. Thus, as compared to when the AD conversion circuit 61 performs pulse frequency modulation (PFM) conversion or pulse width modulation (PWM) conversion, the measurement accuracy of the ignition voltage is higher.

(4) When the low-voltage circuit 80 of the comparative example is used, the resistance values of the voltage divider resistor elements 97 to 99 need to be changed to change the overvoltage determination threshold value and the low-voltage determination threshold value. When the low-voltage circuit 40 is used, the overvoltage determination threshold value and the low-voltage determination threshold value stored in the memory only need to be rewritten. Thus, the overvoltage determination threshold value and the low-voltage determination threshold value are readily changed.

(5) When the low-voltage circuit 80 of the comparative example is used, the control device 33 determines whether the ignition voltage is higher than the overvoltage determination threshold value and whether the ignition voltage is lower than the low-voltage determination threshold value. However, the control device 33 cannot recognize the value of the ignition voltage. In the embodiment, the low-voltage circuit 40 is used so that the control device 33 detects the value of the ignition voltage.

(6) When the low-voltage circuit 80 of the comparative example is used, the control device 33 cannot determine that a fault has occurred in the ignition voltage detection circuit 85 even if the output of the ignition voltage detection circuit 85 is maintained at the low level. When the low-voltage circuit 40 of the embodiment is used, a fault has occurred in the ignition voltage detection circuit 60 if the digital signal is maintained at the high or low level. This allows the control device 33 to determine that a fault has occurred in the ignition voltage detection circuit 60 from the digital signal.

(7) When the low-voltage circuit 80 of the comparative example is used, the motor-driven compressor 20 needs to individually include an insulating element for overvoltage determination and an insulating element for low-voltage determination. When the low-voltage circuit 40 of the embodiment is used, only the insulating elements 71 that transmit the digital signal is required. Thus, the number of insulating elements 71 is reduced. This reduces the number of times the function of the insulating element 71 is checked. Accordingly, the burden of managing the insulating elements 71 is reduced. Further, when an isolator is used as the insulating element 71, the isolator may be a noise source. Noise is lowered by reducing the number of insulating elements 71.

(8) When the low-voltage circuit 80 of the comparative example is used, a voltage drop occurs due to the load switch 91. When the low-voltage circuit 40 of the embodiment is used, the voltage drop due to the load switch 91 does not occur. This reduces power loss.

(9) When the low-voltage circuit 80 of the comparative example is used, inrush currents are generated if the load switch 91 is turned on. When the low-voltage circuit 40 is used, inrush currents are reduced. Accordingly, the vehicle 10 has a fuse that is reduced in size.

(10) When the low-voltage circuit 80 of the comparative example is used, the Zener diode 94 needs to be disposed to protect the load switch 91. When the low-voltage circuit 40 of the embodiment is used, the Zener diode 94 does not need to be used. Accordingly, the noise caused by the Zener diode 94 is reduced.

(11) When the low-voltage circuit 80 of the comparative example is used, the load switch 91 needs to be turned on. This increases the time from when the wake-up signal Si is received to when the ignition voltage is applied to the connection line 41. When the low-voltage circuit 40 of the embodiment is used, the load switch 91 does not need to be turned on. This shortens the time from when the wake-up signal Si is received to when the ignition voltage is applied to the connection line 41.

(12) When the filter circuit 43 resonates, the ignition voltage increases. The low-voltage circuit 40 of the embodiment does not need to include the load switch 91. Thus, the capacitance of the capacitor 48 increases. This limits an increase in the ignition voltage that occurs when the filter circuit 43 resonates.

Modifications

The present embodiment may be modified as follows. The present embodiment and the following modifications can be combined as long as the combined modifications remain technically consistent with each other.

If the voltage of the digital signal output from the AD conversion circuit 61 is detected by the insulating element 71, the ignition voltage detection circuit 60 does not have to include the converter 62.

The detection circuit 51 may output information other than the value of the ignition voltage to the control device 33. For example, the detection circuit 51 may output the temperature of a temperature measurement target to the control device 33.

If the control device 33 and the detection circuit 51 are disposed in a circuit having the same voltage level, the motor-driven compressor 20 does not have to include the insulating element 71.

The AD conversion circuit 61 may convert an analog signal into a digital signal through PFM conversion. In PFM conversion, an analog signal is converted into a digital signal having a frequency proportional to a voltage.

The AD conversion circuit 61 may convert an analog signal into a digital signal through PWM conversion. In PWM conversion, an analog signal is converted into a digital signal having a pulse width proportional to a voltage.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor for a vehicle, the motor-driven compressor comprising:
 a high-voltage circuit connected to a high-voltage battery and configured to operate based on power supplied from the high-voltage battery, the high-voltage circuit including:
  an electric motor, an inverter configured to supply AC power to the electric motor, and
 processing circuitry configured to control the inverter;
 a compression portion configured to be driven by the electric motor; and
 a low-voltage circuit connected to a low-voltage battery and configured to operate based on power supplied from the low-voltage battery, the low-voltage circuit including a connection line connected to the low-voltage battery, and a detection circuit connected to the connection line and configured to detect an on-voltage received from the low-voltage battery via a start switch of the vehicle,
 wherein the detection circuit includes:
  a power supply terminal electrically connected to the low-voltage battery via the connection line,
  a signal input terminal configured to receive a wake-up signal from an upper-rank control device,
  an AD conversion circuit configured to convert the on-voltage received from the low-voltage battery from an analog signal to a digital signal,
  a switching element located at an on-voltage input side of the AD conversion circuit and connected to the power supply terminal, and
  a switch that connects the switching element to the signal input terminal, the switch being configured to turn on the switching element when receiving the wake-up signal from the signal input terminal,
 wherein the processing circuitry is configured to determine that the low-voltage battery is in an overvoltage state and stop the motor-driven compressor for the vehicle when a value of the on-voltage detected from the digital signal is larger than an overvoltage determination threshold value, and
 wherein a connection between the low-voltage battery, the connection line, the power supply terminal, and the switching element is separate from a connection between the switching element, the switch, the signal input terminal, and the upper-rank control device.

2. The motor-driven compressor for the vehicle according to claim 1, wherein the processing circuitry is configured to determine that the low-voltage battery is in a low-voltage state and stop the motor-driven compressor for the vehicle when the value of the on-voltage detected from the digital signal is smaller than a low-voltage determination threshold value.

3. The motor-driven compressor for the vehicle according to claim 1, wherein the AD conversion circuit is configured to convert the analog signal into bit information.

4. A motor-driven compressor for a vehicle, the motor-driven compressor comprising:
 a high-voltage circuit connected to a high-voltage battery and configured to operate based on power supplied from the high-voltage battery, the high-voltage circuit including:
  an electric motor,
  an inverter configured to supply AC power to the electric motor, and
  processing circuitry configured to control the inverter;
 a compression portion configured to be driven by the electric motor; and
 a low-voltage circuit connected to a low-voltage battery and configured to operate based on power supplied from the low-voltage battery, the low-voltage circuit including a connection line connected to the low-voltage battery, and a detection circuit connected to the connection line and configured to detect an on-voltage received from the low-voltage battery via a start switch of the vehicle, wherein the detection circuit includes:

a power supply terminal electrically connected to the low-voltage battery via the connection line, a signal input terminal configured to receive a wake-up signal from an upper-rank control device, an AD conversion circuit configured to convert the on-voltage received from the low-voltage battery from an analog signal to a digital signal, a switching element located at an on-voltage input side of the AD conversion circuit and connected to the power supply terminal, and a switch that connects the switching element to the signal input terminal, the switch being configured to turn on the switching element when receiving the wake-up signal from the signal input terminal, wherein the processing circuitry is configured to determine that the low-voltage battery is in a low-voltage state and stop the motor-driven compressor for the vehicle when a value of the on-voltage detected from the digital signal is smaller than a low-voltage determination threshold value, and wherein a connection between the low-voltage battery, the connection line, the power supply terminal, and the switching element is separate from a connection between the switching element, the switch, the signal input terminal, and the upper-rank control device.

5. The motor-driven compressor for the vehicle according to claim 4, wherein the AD conversion circuit is configured to convert the analog signal into bit information.

6. The motor-driven compressor for the vehicle according to claim 1, further comprising an insulating element connecting the high-voltage circuit and the low-voltage circuit, wherein the AD conversion circuit is connected to the processing circuitry by the insulating element.

7. The motor-driven compressor for the vehicle according to claim 4, further comprising an insulating element connecting the high-voltage circuit and the low-voltage circuit, wherein the AD conversion circuit is connected to the processing circuitry by the insulating element.

* * * * *